United States Patent Office 3,407,228
Patented Oct. 22, 1968

3,407,228
CONTINUOUS PRODUCTION OF
MUCOCHLORIC ACID
Herbert Maisack and Helmut Schlecht, Ludwigshafen (Rhine), and Hans Urbach, Lampertheim, Hesse, Germany, assignors to Badische Anilin- & Soda-Fabrik Aktiengesellschaft, Ludwigshafen (Rhine), Germany
No Drawing. Filed Aug. 12, 1965, Ser. No. 479,338
Claims priority, application Germany, Aug. 17, 1964,
B 78,133
9 Claims. (Cl. 260—539)

ABSTRACT OF THE DISCLOSURE

Production of mucochloric acid from furfurol and chlorine in aqueous acid medium by continuous process in tubular recirculation system wherein weight ratio of added furfurol to reaction mixture is constantly less than 1:100.

---

The invention relates to a process for the continuous production of muchochloric acid by reaction of furfurol with chlorine. More specifically, the invention relates to an improvement of this process.

It is known that mucochloric acid is obtained when furfurol is treated in aqueous acid solution with chlorine or agents which yield chlorine. For example a process is described in U.S. patent specification No. 2,821,553 in which chlorine gas and furfurol are passed in a molar ratio of at least 6:1 into an aqueous hydrochloric acid solution heated to a temperature of 40° to 110° C. and the mucochloric acid formed is separated by cooling. Yields of about 65% of the theory, with reference to furfurol, are obtained by this method.

We have now found that mucochloric acid is obtained in substantially increased yields by reaction of furfurol with chlorine in aqueous acid medium, if desired at elevated temperatures and superatmospheric pressure, by passing the reaction mixture in a recirculation system and supplying the reactants at such a rate that the weight ratio of the added furfurol to the reaction mixture absorbing it is kept continuously at a value less than 1:100.

The production of mucochloric acid by reaction of furfurol with chlorine in aqueous acid medium proceeds according to the equation:

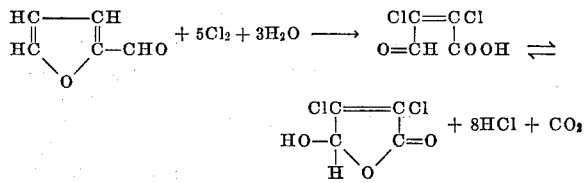

The mucochloric acid thus formed may thus be present in open-chain or cyclic form. The equation shows that the minimum requirement of chlorine for complete reaction is 5 moles per mole of furfurol. In all modifications of this reaction which have been previously described, however, much larger amounts of chlorine have in fact been used, its character as a gas naturally giving rise to losses; for example the said U.S. patent specification in the general description gives a relatively small excess (20%) of chlorine—i.e., 6 moles as the minimum amount —but much larger excesses are given in the examples.

In contrast to this, a much smaller excess of chlorine is required in the new process as compared with the minimum amount specified in the said prior specification.

This may be attributed particularly to the fact that the chlorine, like the furfurol, is dissolved in the reaction mixture immediately after it enters the same, to such an extent, and also enters so rapidly into substantially complete reaction, that losses are kept at an extremely low level. The yields may be increased by decreasing the proportion of added reactants to the absorbent flowing reaction mixture per unit of time. Particularly high yields may be achieved when the ratio by weight of furfurol to reaction mixture is from about 1:1000 to 1:5000.

All inorganic or organic substances which have an acid reaction and which are adequately soluble in water may be used as acids for the purposes of the new process provided they are not changed under the reaction conditions. Mineral acids, such as hydrochloric acid, sulfuric acid or phosphoric acid are particularly suitable. The acid content in the reaction mixture is advantageously 5 to 50% by weight, particularly 10 to 30% by weight. If the acid mother liquor from the crystallization of the mucochloric acid be returned (this being advantageous although not necessary for the operation of the process) there is the added advantage that at the same time a part of the acid withdrawn is recycled. The remainder may be made by appropriate addition of fresh acid.

The temperature range which is suitable for the new process is from ambient temperature to about 120° to 130° C., preferably from 40° to 100° C. The reaction may be carried out with advantage at superatmospheric pressure, for example pressures up to 5 atmospheres gauge, but this is not essential.

Open or closed recirculation systems, wholly or substantially composed of tubes or tube bundles, may be used. Movement of the circulating liquid may be effected by pumping, for example by means of a centrifugal pump of ceramic material, or a propellant gas, for example nitrogen, carbon dioxide, hydrogen chloride or steam or a mixture of such gaseous substances, may be injected according to the principle of the air lift pump, and this assists the desorption of the gas formed by the reaction. The recirculation line is sufficiently long for practically complete reaction to have been achieved at the latest after one complete cycle of the reaction mixture.

Particularly good results are achieved when a line diameter is chosen which produces turbulent flow. It is known that this is the case above the limiting condition of turbulence, i.e. at Reynolds' numbers of at least about 2000. Owing to chlorine being a gas, it may be favorable to inject it in a descending branch of the loop where, against its attepmts to ascend, it is rapidly dispersed and dissolved by the current. It is however also very advantageous to inject not only the propellant gas but also furfurol and chlorine in an ascending branch of the loop, so that particularly high rates of flow and throughputs are achieved in a cocurrent method. In this case it is advantageous to use higher columns than in the said countercurrent method. Residence times of the reaction components in the recirculation system are from a few minutes to a hundred hours, especially from one to ten hours.

When using an open loop, the reaction product is advantageously withdrawn by means of an overflow, and when using a closed loop, for example through a valve. The withdrawn mixture may then be cooled to crystallize the mucochloric acid formed at temperatures from −10° to +70° C., especially from 0° to +40° C. The mucochloric acid is filtered off and if necessary washed with water and thereafter the mother liquor and if desired the wash liquors may be returned to the loop with advantage. Moreover, the invention permits a new, particularly advantageous embodiment of the process in which the reaction solution obtained (which contains the mucochloric acid in very pure form) is used direct for further reactions while dispensing with any form of working up. Then appropriate amounts of water and acid are freshly added to the loop to replace the portions removed. Even when the muchochloric acid crystallizes out, it is in general capable of being used for further reactions without purification.

In addition to the general advantages of continuous operation and the particular advantage of a saving in chlorine, the new process has the special advantage of considerably increasing the yield and in particular the space-time yield. Thus in the said U.S. patent specification it is stated in Example 2 in an experiment carried out continuously over a long period that an average yield of 65.1% of the theory is obtained, whereas by the new process according to this invention the yield is more than 90% of the theory, usually about 95% or more. The fact that continuous operation has hitherto not brought any substantial advantages in the production of mucochloric acid from furfurol and chlorine implies that the considerable advantages of the new process could not be deduced from the prior art.

Mucochloric acid may be used chiefly as an intermediate, particularly for the production of plant protection agents and dyes.

The invention is further illustrated by the following examples.

Example 1

The loop used, which holds about 10 liters of reaction mixture, consists of two vertical tubes, each about 3 meters in length, joined together at the top and bottom by two short horizontal tubes. One of the vertical tubes has a diameter of 80 mm. for a length of 0.5 meter at the top, then downward for a length of 1.5 meters the diameter is constricted to 25 mm., and the bottom portion having a length of 1 meter has a diameter of 50 mm. At the point of transition from the tube width of 25 mm. to a diameter of 50 mm., two inlet pipes are provided for chlorine and furfurol. The other vertical tube has an inlet tube or propellant gas at the bottom and at its upper end it is provided with a gas outlet and an overflow provided with a siphon. This tube can be heated externally.

The apparatus is filled with the mother liquor from an earlier batch which contains an amount of mucochloric acid equivalent to its solubility at crystallization temperature and also water, hydrogen chloride and small amounts of unidentified organic compounds (byproducts of the reaction). It is heated to 90° C. by the external heating means. 300 liters per hour of nitrogen is blown in through the inlet for propellant gas and the circulatory flow is thus started up. 197 liters of chlorine gas and 0.13 liter of furfurol per hour are introduced at the appropriate points and are completely absorbed by the solution flowing countercurrent.

Reaction to form mucochloric acid thus takes place in homogeneous liquid phase in the downward flow and the gases formed (hydrogen chloride and carbon dioxide) at first remain in solution. It is only by the injection of nitrogen that the said gases are liberated in the ascending portion of the loop, and this in turn accelerates the circulation of the liquid. The offgas (consisting of hydrogen chloride, carbon dioxide, nitrogen, some water vapor and very small amounts of chlorine) is released through the gas outlet and cooled. The aqueous hydrochloric acid thus condensed may be allowed to flow back into the circulating liquid. Since a decrease in the water content of the circulating liquid occurs in spite of the gassing out of the amount of water and by the reaction itself, fresh water or aqueous washing liquor from mucochloric acid isolated earlier is continuously supplied in appropriate amounts' 1.15 liters per hour of the reaction mixture, having a density of 1,283 g./ml. (measured at 60° C.), is continuously withdrawn by means of the overflow and the liquid is allowed to cool to 20° C. while stirring. Mucochloric acid crystallizes out and is separated and dried. White crystallized mucochloric acid (melting point 123° to 124° C.) is thus obtained in a yield of about 95.4% of the theory, with reference to furfurol during operation of the apparatus for several days, the daily yield varying between 94 and 96% of the theory. The product may be further used without purification or if desired without isolation. The mother liquor and aqueous wash liquors are continuously returned to the loop.

Example 2

A loop consisting of two vertical tubes joined together at the top and bottom by two shorter horizontal tubes is again used for the reaction of furfurol with chlorine. Each vertical tube is 12 meters in length and one (the descending branch) has a diameter of 250 mm. and the other (the ascending branch) has a diameter of 700 mm. The latter tube has at the bottom separate inlets for chlorine gas and for furfurol and, at a height of about 8 meters measured from the bottom, an inlet pipe for air as propellant gas. There is a gas outlet at the top of the circulation apparatus.

The circulation apparatus is filled with an aqueous solution which contains about 24% by weight of mucochloric acid and other organic byproducts formed in the reaction and also hydrogen chloride. The temperature of the circulating liquid is 90° C.

81,000 liters of chlorine gas, 55 liters of furfurol, 90 liters of water and 15,000 liters of air are injected through the inlet pipes. A rapid circulation of about 180,000 liters per hour and an intense mixing of the reaction mixture is effected by the gases supplied and formed by the reaction, namely hydrogen chloride and carbon dioxide.

The offgas leaves the apparatus at the top of the ascending branch. It consists of hydrogen chloride, carbon dioxide, air, water vapor and very small amounts of chlorine. It is cooled so that aqueous hydrochloric acid is condensed.

The apparatus holds a total of about 5,000 liters of reaction liquid. 510 liters per hour thereof is run off continuously into a crystallizer in which the liquid is cooled to $+8°$ C. while stirring. Mucochloric acid thus crystallizes out and is separated, washed with a little water and dried.

Crystallized mucochloric acid having a melting point of 125° C. is obtained in this way in a yield of 93% of the theory, with reference to furural. The mother liquor and aqueous wash liquor are returned continuously to the loop. The said yield may be maintained undiminished for months.

We claim:

1. A process for the continuous production of mucochloric acid by reaction of furfurol with at least 5 moles of gaseous chlorine per mole of furfurol in aqueous acid medium, at a temperature in the range of ambient temperature to 130° C., continuously supplying the reactants and continuously withdrawing the reaction product, wherein the reaction mixture is circulated in a tubular recirculation system and the reactants are supplied at such a rate that the weight ratio of the furfurol added to the reaction mixture which absorbs it is constantly less than a value of 1:100.

2. A process as claimed in claim 1 carried out at elevated temperature in the range of 40°–100° C.

3. A process as claimed in claim 1 carried out at superatmospheric pressure.

4. A process as claimed in claim 1 in which the ratio by weight of furfurol introduced to the circulating reaction mixture is from about 1:1000 to 1:5000.

5. A process as claimed in claim 1 wherein the aqueous acid medium contains a mineral acid.

6. A process as claimed in claim 1 wherein the acid content of the reaction mixture is from 5 to 50% by weight.

7. A process as claimed in claim 1 wherein circulation of the reaction mixture is effected by a centrifugal pump.

8. A process as claimed in claim 1 wherein circulation of the reaction mixture is increased by injecting a propellant gas.

9. A process as claimed in claim 1 wherein the recirculation apparatus used comprises two substantially vertical tubes joined together at the top and bottom by two substantially horizontal tubes, the diameter of the tubes being such as to produce turbulent flow.

References Cited

UNITED STATES PATENTS 2,821,553  1/1958  Dunlop _____ 260—539

FOREIGN PATENTS 3,819,266  9/1963  Japan.

LORRAINE A. WEINBERGER, *Primary Examiner.*

A. P. HALLIUN, *Assistant Examiner.*